(12) United States Patent
Ro

(10) Patent No.: US 9,964,220 B1
(45) Date of Patent: May 8, 2018

(54) ELECTROMAGNETIC WATER SUPPLY VALVE

(71) Applicant: USEONG ELECTRO-MECHANICS CO., LTD., Anyang-si (KR)

(72) Inventor: Gwan Ho Ro, Seoul (KR)

(73) Assignee: USEONG ELECTRO-MECHANICS CO., LTD., Anyang-si (KR)

( * ) Notice: Subject to any disclaimer, the term of this patent is extended or adjusted under 35 U.S.C. 154(b) by 0 days. days.

(21) Appl. No.: 15/790,602

(22) Filed: Oct. 23, 2017

(51) Int. Cl.
*F16K 31/06* (2006.01)
*F16K 7/16* (2006.01)
*F16K 27/02* (2006.01)
*F16K 1/12* (2006.01)

(52) U.S. Cl.
CPC .................. *F16K 7/16* (2013.01); *F16K 1/12* (2013.01); *F16K 27/029* (2013.01); *F16K 31/0655* (2013.01); *F16K 31/0675* (2013.01); *Y10T 137/5987* (2015.04)

(58) Field of Classification Search
CPC ............... F16K 27/029; F16K 31/0655; F16K 31/0675; Y10T 137/0491; Y10T 137/5987
See application file for complete search history.

(56) References Cited

U.S. PATENT DOCUMENTS

| | | | | |
|---|---|---|---|---|
| 6,076,550 A * | 6/2000 | Hiraishi | .............. | F16K 31/0655 137/550 |
| 6,269,834 B1 * | 8/2001 | Huhnen | .............. | F15B 13/0817 137/269 |
| 6,457,484 B1 * | 10/2002 | Najmolhoda | ......... | F16K 31/082 137/15.18 |
| 6,684,901 B1 * | 2/2004 | Cahill | ................ | F16K 31/0655 137/15.18 |

FOREIGN PATENT DOCUMENTS

KR  101521569  5/2015

* cited by examiner

*Primary Examiner* — Matthew W Jellett
(74) *Attorney, Agent, or Firm* — Cantor Colburn LLP

(57) ABSTRACT

Provided is an electromagnetic water supply valve including: a valve body including an upper member divided into upper and lower portions, a lower member configured such that water inlet and outlet are provided at the lower portion thereof and hooks are provided on an upper surface thereof, and a diaphragm horizontally disposed between the upper and lower members and resiliently mounted in the valve body by using a restorative element; an electromagnet unit being provided on the valve body, and including a bobbin and a yoke; and a plunger being provided between the valve body and the electromagnet unit by penetrating therethrough in an axial direction thereof and operating in conjunction with the diaphragm, so as to be magnetically moved up and down by a magnetic force generated by the bobbin in response to electrical control signals, thereby controlling water supply for an appliance.

3 Claims, 4 Drawing Sheets

ELECTROMAGNETIC WATER SUPPLY VALVE

BACKGROUND OF THE INVENTION

Field of the Invention

The present invention relates to an electromagnetic water supply valve, which is an improved version of Korean Patent No. 10-1521569 filed by the inventor of the present invention Description of the Related Art An electromagnetic valve for controlling water supply using an electromagnet is applied to appliances requiring automatic water supply such as washing machines, refrigerators, drink vending machines, dishwashers, and boilers. The electromagnetic valve is installed at the end of the water supply system such as a water pipe or at the water supply side of the appliance to serve to control supply of the water.

The electromagnetic water supply valve generally includes a valve body and an electromagnet unit, wherein the valve body includes: a cap-shaped upper member divided into upper and lower portions; a lower member water provided with an inlet and an outlet; and a diaphragm horizontally provided between the upper and lower members to divide upper and lower sections and resiliently mounted in the valve body by using a restorative element.

Further, the electromagnet unit includes a bobbin and a yoke, and is mounted to the upper surface of the valve body. Here, a plunger operating in conjunction with the diaphragm is interposed between the valve body and the electromagnet unit in an axial direction thereof, so as to be magnetically moved up and down by a magnetic force generated by the bobbin of the electromagnet unit in response to electrical control signals applied thereto, thereby controlling water supply.

To simplify assembly structure of the valve body and the electromagnet unit in the electromagnetic water supply valve configured as described above and to improve productivity, a coupling structure of a force-fitting type elastic piece (a hook) has been developed and used instead of a conventional screw type coupling manner.

The force-fitting type coupling structure using the elastic piece is problematic in that the coupling is structurally unstable.

To be more specific, multiple hooks are vertically provided on the upper surface of the upper member (coupling member) of the valve body, and hooking pieces corresponding to the hooks are provided on a support plate of the yoke of the electromagnet unit (electromagnet member) to be forcibly hooked to the hooks, thereby assembling the electromagnetic water supply valve. In the force-fitting type coupling structure using the hooks of the upper member and the hooks provided on a support plate of the yoke of the electromagnet unit, the hooks forcibly push out the hooking pieces when being assembled, and after assembly, the hooking pieces are fastened by the elastic restoring force thereof, which is problematic in that the hooking pieces break frequently due to a worker error during assembly work, and the restoration of the hooking piece is not secured, thus leading to loose coupling.

Further, as described above, the yoke of the electromagnet unit is configured such that it is divided into the main body and the support plate, and the support plate is engaged from the bottom of the main body by using a male-female coupling structure (the hooking piece and the coupling groove). The partition structure of the yoke body is structurally unstable, and requires unnecessary increase in the number of parts and the number of assembly work, whereby the assemblability and the productivity are lowered.

DOCUMENTS OF RELATED ART (Patent Document 1) Korean Patent No. 10-1521569.

SUMMARY OF THE INVENTION

Accordingly, the present invention has been made keeping in mind the above problems occurring in the prior art, and an object of the present invention is to provide an electromagnetic water supply valve configured such that a body of a yoke of an electromagnet unit is unified, and coupling between a valve body and the yoke is performed by rotation using female coupling holes each including an inlet opening and a tightening slit circumferentially communicating with each other, whereby it is possible to reduce the number of parts, and possible to firmly couple the valve body and the yoke, thereby increasing the assemblability and the productivity.

In order to accomplish the above object, the present invention provides an electromagnetic water supply valve including: a valve body including an upper member divided into upper and lower portions, a lower member configured such that water inlet and outlet are provided at the lower portion thereof and hooks are provided on an upper surface thereof, and a diaphragm horizontally disposed between the upper and lower members to divide an interior of the valve body into upper and lower sections and resiliently mounted in the valve body by using a restorative element; an electromagnet unit being provided on the valve body, the electromagnet unit including a bobbin and a yoke; and a plunger being provided between the valve body and the electromagnet unit by penetrating therethrough in an axial direction thereof and operating in conjunction with the diaphragm, so as to be magnetically moved up and down by a magnetic force generated by the bobbin of the electromagnet unit in response to electrical control signals applied thereto, thereby controlling water supply for an appliance, wherein the yoke includes a base and a support plate provided to face each other at a top and a bottom thereof, and a connecting plate provided between the base and the support plate, and the base of the yoke is circumferentially provided with female coupling holes corresponding to the hooks, each of the female coupling holes having an inlet opening and a tightening slit circumferentially communicating with each other, wherein, each of the hooks is inserted into and withdrawn from an associated one of the female coupling holes of the yoke through the inlet opening, and is tightened to the female coupling hole at the tightening slit.

According to the electromagnetic water supply valve of the present invention, since the body of the yoke of the electromagnet unit is unified, it is possible to reduce the number of parts through simplifying the structure, and it is possible to achieve a stable and firm coupling structure.

Further, since the present invention is configured such that the coupling between the electromagnet unit and the valve body is performed by rotation using female coupling holes each including an inlet opening and a tightening slit circumferentially communicating with each other, it is possible to solve the problems such as damage due to a conventional force fitting manner, and it is possible to increase the assemblability and the productivity.

BRIEF DESCRIPTION OF THE DRAWINGS

The above and other objects, features and other advantages of the present invention will be more clearly understood from the following detailed description when taken in conjunction with the accompanying drawings, in which:

FIGS. 4A and 4B are explanatory views showing the process of coupling and separating the valve body and the electromagnet unit of the electromagnetic water supply valve of the present invention, wherein FIG. 4A is a view showing a state where the valve body and the electromagnet unit are coupled or separated, and FIG. 4B is a view showing a state where the valve body and the electromagnet unit are coupled together.

DESCRIPTION OF THE REFERENCE NUMERALS IN THE DRAWINGS

Figure 1:
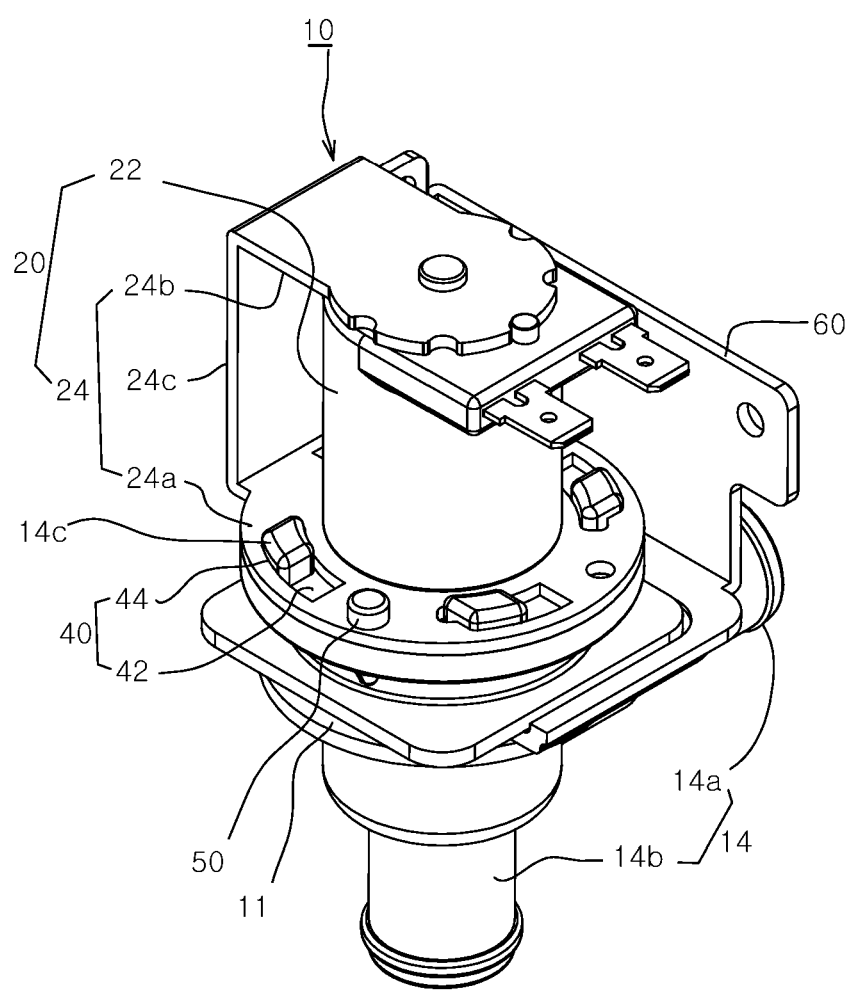
FIG. 1 is a perspective view showing an overall configuration of an electromagnetic water supply valve of the present invention.

10: valve body
12: upper member
14: lower member
16: diaphragm
20: electromagnet unit
22: bobbin
24: yoke
24a: base
24b: support plate
24c: connecting plate
30: plunger
40: coupling portion
42: inlet opening
44: tightening slit
50: coupling pin
60: bracket

DETAILED DESCRIPTION OF THE INVENTION

Figure 2:
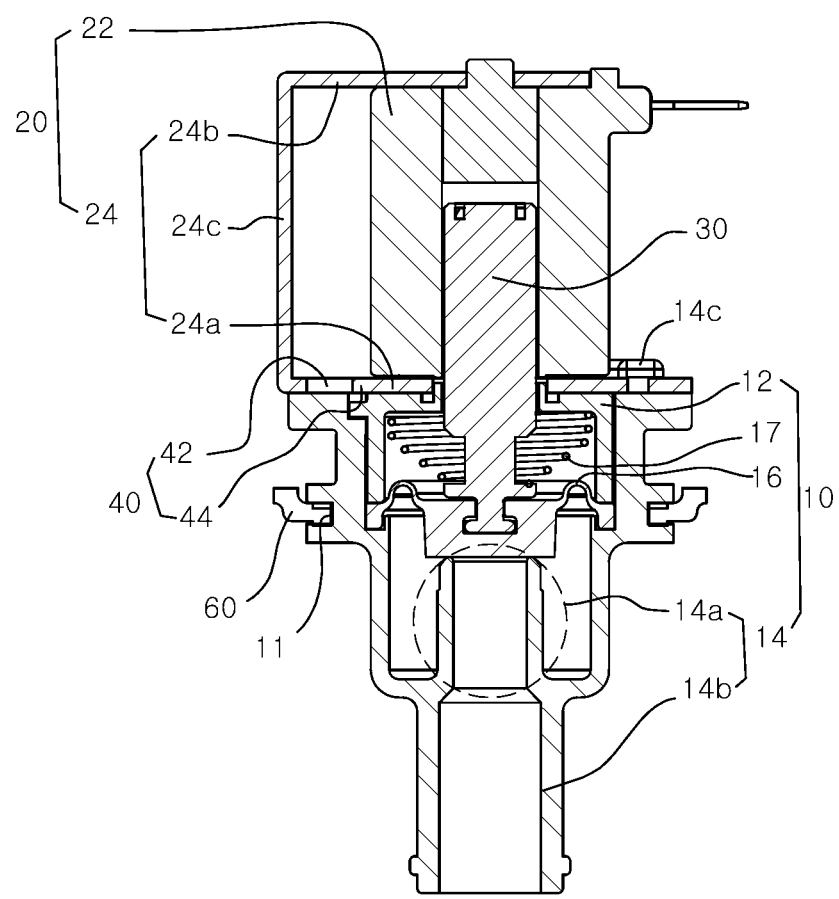
FIG. 2 is a longitudinal sectional view schematically showing an internal configuration of the electromagnetic water supply valve of the present invention.
Figure 3:
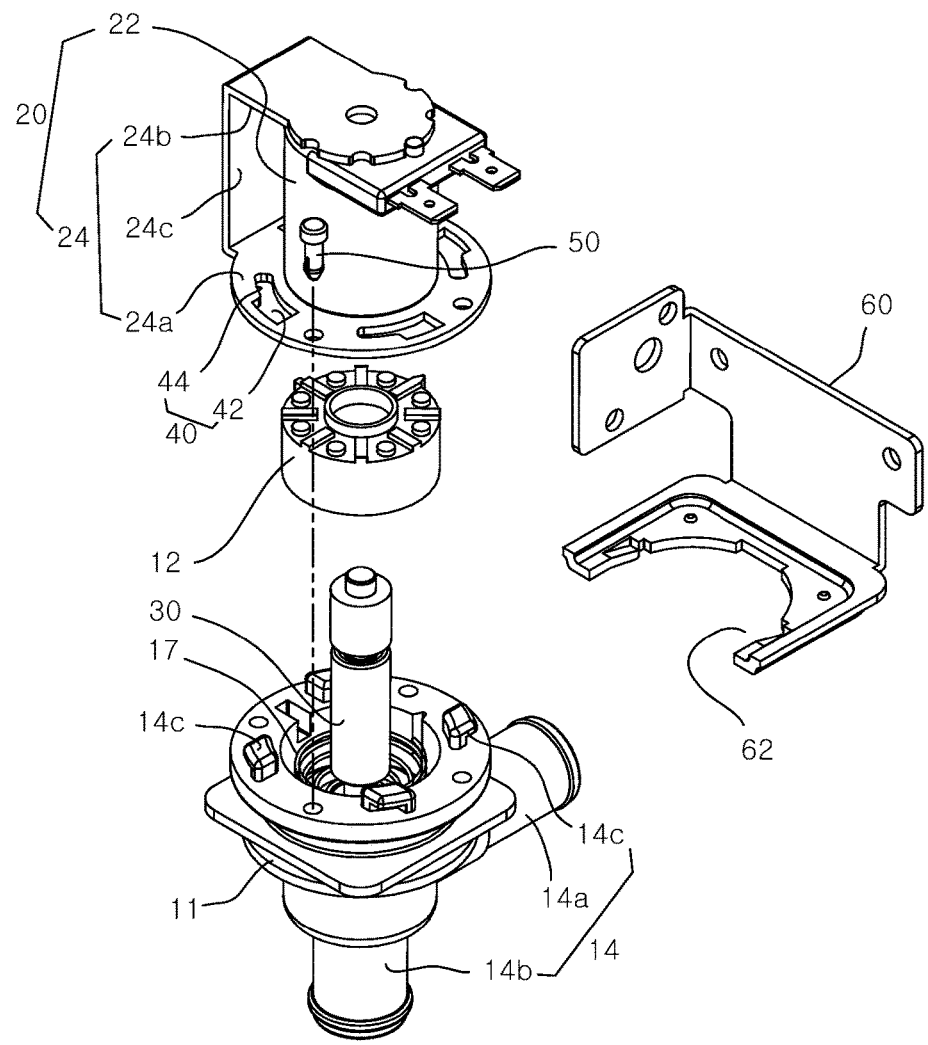
FIG. 3 is an exploded perspective view showing the electromagnetic water supply valve of the present invention.

Hereinbelow, an exemplary embodiment of the present invention will be described in detail with reference to the accompanying drawings. FIGS. 1 to 3 show an electromagnetic water supply valve according to the present invention in detail.

The present invention provides an electromagnetic valve applied to all household appliances requiring automatic water supply such as washing machines, refrigerators, dishwashers, and the like.

The electromagnetic water supply valve generally includes a valve body 10 and an electromagnet unit 20, wherein the valve body 10 includes: an upper member 12 divided into upper and lower portions; a lower member 14 configured such that water inlet and outlet 14a and 14b is provided at the lower portion thereof and hooks 14c are provided on the upper surface thereof to be coupled to the electromagnet unit; and a diaphragm 16 horizontally provided between the upper and lower members 12 and 14 in the valve body to divide an interior of the valve body into upper and lower sections and resiliently mounted in the valve body by using a restorative element 17.

Further, the electromagnet unit 20 includes a bobbin 22 and a yoke 24, and is mounted to the valve body 10.

Further, a plunger 30 is provided between the valve body 10 and the electromagnet unit 20 by penetrating therethrough in an axial direction thereof and operating in conjunction with the diaphragm 16, so as to be magnetically moved up and down by a magnetic force generated by the bobbin of the electromagnet unit in response to electrical control signals applied thereto, thereby controlling water supply for an appliance.

The above configuration is the same as the conventional one, and the key technology in the present invention is that the structure is simplified and the coupling between the electromagnet unit and the valve body is performed in a forward direction in order to solve problems such as damage and loose coupling due to force fitting between the electromagnet unit and the valve body 10, and an increase in the number of unnecessary parts.

In the present invention, the yoke 24 of the electromagnet unit 20 includes a base 24a and a support plate 24b provided to face each other at the top and the bottom, and a connecting plate 24c provided therebetween.

Further, the base 24a of the yoke 24 is circumferentially provided with female coupling holes 40 to correspond to male hooks 12a. Here, each of the female coupling holes 40 includes an inlet opening 42 and a tightening slit 40.

Further, the upper surface of the valve body 10 and the base 24a of the yoke 24 of the electromagnet unit 20 are aligned with each other and fastened to each other by using a coupling pin 50 that is inserted through the base 24a to be coupled with the upper surface of the valve body 10.

Figure 4B:
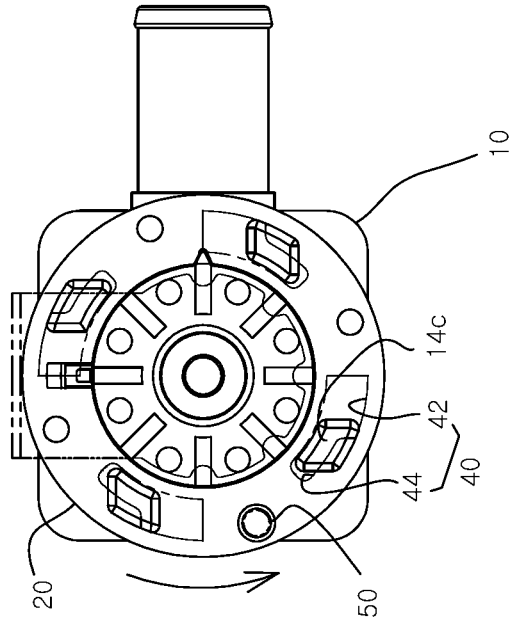
Figure 4A:
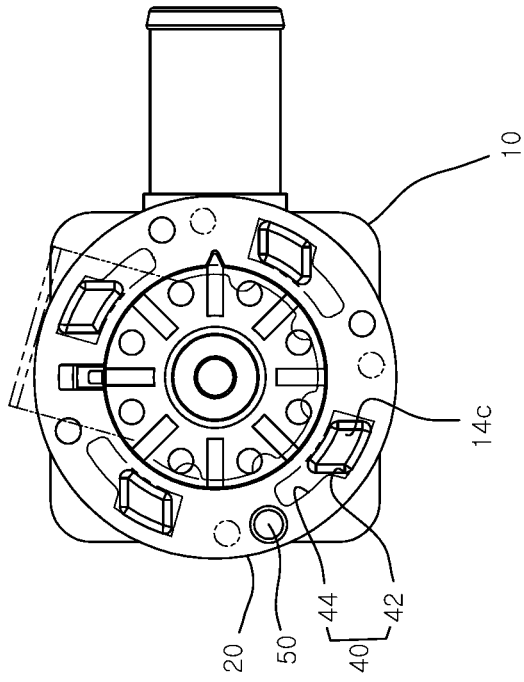

Referring to FIGS. 4A and 4B, reference will be made to the process of coupling and separating the valve body and the electromagnet unit of the electromagnetic water supply valve of the present invention.

FIG. 4A shows a state where the electromagnet unit 20 is coupled to or separated from the valve body 10, wherein after the hooks 14c of valve body 10 and the electromagnet unit 20 are aligned with each other via the inlet openings 42 of the female coupling holes 40, and they are coupled to or separated from each other by engaging or disengaging the electromagnet unit 20 through the inlet openings 42.

In FIG. 4B, as in FIG. 4A, in the state where each of the hooks 14c of valve body 10 is inserted through the associated one of the inlet openings 42 of the female coupling holes 40 of the electromagnet unit 20, the electromagnet unit 20 is rotated counterclockwise as indicated by the arrow such that the valve body 10 and the electromagnet unit 20 are coupled to each other in a hooking manner.

Further, as in FIG. 4B, after coupling is completely made, two parts are firmly coupled to each other by using the coupling pin 50 provided through between the base 24a of the yoke 24 of the electromagnet unit 20 and the valve body 10.

Meanwhile, a bracket 60 for coupling the valve body 10 to a peripheral component of the appliance is detachably engaged with the valve body by a female receiving structure 62 provided in the bracket 60.

The bracket 60 for coupling the valve body 10 to the peripheral component of the appliance is configured such that the female receiving structure 62 provided in the bracket 60 is detachably engaged with an insertion hole 11 provided in a circumferential wall of the valve body 10.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electromagnetic water supply valve comprising:
a valve body including an upper member divided into upper and lower portions, a lower member configured such that water inlet and outlet are provided at the lower portion thereof and hooks are provided on an upper surface thereof, and a diaphragm horizontally disposed between the upper and lower members to divide an interior of the valve body into upper and lower sections and resiliently mounted in the valve body by using a restorative element;
an electromagnet unit being provided on the valve body, the electromagnet unit including a bobbin and a yoke; and
a plunger being provided between the valve body and the electromagnet unit by penetrating therethrough in an axial direction thereof and operating in conjunction with the diaphragm, so as to be magnetically moved up and down by a magnetic force generated by the bobbin of the electromagnet unit in response to electrical control signals applied thereto, thereby controlling water supply for an appliance,
wherein the yoke includes a base and a support plate provided to face each other at a top and a bottom thereof, and a connecting plate provided between the base and the support plate, and
the base of the yoke is circumferentially provided with female coupling holes corresponding to the hooks, each of the female coupling holes having an inlet opening and a tightening slit circumferentially communicating with each other,
wherein, each of the hooks is inserted into and withdrawn from an associated one of the female coupling holes of the yoke through the inlet opening, and is tightened to the female coupling hole at the tightening slit.

2. The electromagnetic water supply valve of claim 1, further comprising:
a coupling pin provided between the valve body and the base of the yoke of the electromagnet unit.

3. The electromagnetic water supply valve of claim 1, further comprising:
a bracket for coupling the valve body to a peripheral component of the appliance, the bracket having a female receiving structure configured to be detachably engaged with an insertion hole provided in a circumferential wall of the valve body in a hooking manner.

* * * * *